United States Patent
Dai et al.

(10) Patent No.: US 9,705,435 B2
(45) Date of Patent: Jul. 11, 2017

(54) METHOD OF CONTROLLING A BRUSHLESS MOTOR

(71) Applicant: Dyson Technology Limited, Wiltshire (GB)

(72) Inventors: Hanping Dai, Malmesbury (GB); Yu Chen, Malmesbury (GB); Mark Edward Leaver, Malmesbury (GB); Samuel Wesley Hinchliffe, Malmesbury (GB)

(73) Assignee: DYSON TECHNOLOGY LIMITED, Malmesbury, Wiltshire (GB)

( * ) Notice: Subject to any disclaimer, the term of this patent is extended or adjusted under 35 U.S.C. 154(b) by 434 days.

(21) Appl. No.: 13/682,819

(22) Filed: Nov. 21, 2012

(65) Prior Publication Data

US 2013/0127384 A1    May 23, 2013

(30) Foreign Application Priority Data

Nov. 23, 2011  (GB) .................................. 1120191.0

(51) Int. Cl.
*H02P 23/12* (2006.01)
*H02K 19/12* (2006.01)
(Continued)

(52) U.S. Cl.
CPC .............. *H02P 6/145* (2013.01); *H02P 6/153* (2016.02); *H02P 6/26* (2016.02); *H02P 29/032* (2016.02); *H02P 6/15* (2016.02)

(58) Field of Classification Search
CPC ......... H02P 6/145; H02P 6/008; H02P 29/028
(Continued)

(56) References Cited

U.S. PATENT DOCUMENTS 6,239,567 B1    5/2001  Sunaga et al.
2007/0252551 A1*  11/2007 Clothier .................. H02P 6/153
                                                318/705
(Continued)

FOREIGN PATENT DOCUMENTS

GB    2479624    10/2011
GB    2480729    11/2011
(Continued)

OTHER PUBLICATIONS

Search Report and Written Opinion mailed Mar. 19, 2013, directed to International Application No. PCT/GB2012/052740; 8 pages.
(Continued)

*Primary Examiner* — Bentsu Ro
*Assistant Examiner* — Zemenay Truneh
(74) *Attorney, Agent, or Firm* — Morrison & Foerster LLP

(57) ABSTRACT

A method of controlling a brushless motor that includes storing a lookup table of control values, periodically obtaining a speed-adjusted control value, and exciting a phase winding of the motor. The speed-adjusted control value is then used to define the phase and/or length of excitation. Obtaining the speed-adjusted control value includes measuring the speed of the motor, increasing or decreasing a speed-adjust variable in the event that the measured speed is greater or less than a threshold, selecting a control value from the lookup table using the measured speed, and adjusting the selected control value using the speed-adjust variable to obtain the speed-adjusted control value. Additionally, a control system that implements the method, and a motor assembly that incorporates the brushless motor and the control system.

9 Claims, 7 Drawing Sheets

(51) Int. Cl.
  *H02P 6/14*    (2016.01)
  *H02P 6/26*    (2016.01)
  *H02P 29/032*  (2016.01)
  *H02P 6/15*    (2016.01)

(58) Field of Classification Search
  USPC ............ 318/400.14, 400.13, 400.12, 400.01
  See application file for complete search history.

(56) References Cited

U.S. PATENT DOCUMENTS

| | | | |
|---|---|---|---|
| 2009/0096398 A1* | 4/2009 | Kyrtsos | ............. H02P 1/04 |
| | | | 318/432 |
| 2010/0251510 A1 | 10/2010 | Clothier et al. | |
| 2011/0254476 A1 | 10/2011 | Clothier et al. | |
| 2011/0254488 A1 | 10/2011 | Clothier et al. | |
| 2012/0081064 A1* | 4/2012 | Leaver | ............ H02P 23/0081 |
| | | | 318/721 |

FOREIGN PATENT DOCUMENTS

| | | |
|---|---|---|
| JP | 4-265682 | 9/1992 |
| JP | 2005-185047 | 7/2005 |
| JP | 2011-229383 | 11/2011 |

OTHER PUBLICATIONS

Search Report dated Mar. 22, 2012, directed to counterpart GB Application No. 1120191.0; 1 page.

\* cited by examiner

| Control Signals | | | Power Switches | | | | Inverter Condition |
|---|---|---|---|---|---|---|---|
| DIR1 | DIR2 | FW# | Q1 | Q2 | Q3 | Q4 | |
| 0 | 0 | X | 0 | 0 | 0 | 0 | Off |
| 1 | 0 | 1 | 1 | 0 | 0 | 1 | Drive Left-to-Right |
| 0 | 1 | 1 | 0 | 1 | 1 | 0 | Drive Right-to-Left |
| 1 | 0 | 0 | 0 | 0 | 0 | 1 | Freewheel Left-to-Right |
| 0 | 1 | 0 | 0 | 0 | 1 | 0 | Freewheel Right-to-Left |
| 1 | 1 | X | - | - | - | - | Illegal |

Fig. 3

| Time (ms) | Speed (krpm) | SPEED_ADJUST (μs) | T_PHASE (μs) |
|---|---|---|---|
| 0 | 94 | 0 | 90 |
| 20 | 96 | 0 | 90 |
| 40 | 98 | 0 | 90 |
| 60 | 99 | 0 | 90 |
| 80 | 100 | 0 | 90 |
| 140 | 101 | 0.25 | 89.75 |
| 160 | 101 | 0.5 | 89.5 |
| 180 | 100 | 0.5 | 89.5 |
| 200 | 99 | 0.5 | 89.5 |
| 220 | 98 | 0.5 | 89.5 |
| 240 | 98 | 0.5 | 89.5 |
| 260 | 98 | 0.5 | 89.5 |
| 280 | 95 | 0.5 | 89.5 |
| 300 | 94 | 0 | 90 |
| 320 | 94 | 0 | 90 |

Fig. 5

METHOD OF CONTROLLING A BRUSHLESS MOTOR

REFERENCE TO RELATED APPLICATIONS

This application claims the priority of United Kingdom Application No. 1120191.0, filed Nov. 23, 2011, the entire contents of which are incorporated herein by reference.

FIELD OF THE INVENTION

The present invention relates to a method of controlling a brushless motor.

BACKGROUND OF THE INVENTION

A brushless motor typically comprises a controller that controls the excitation of phase windings. The controller may adjust the phase and/or the length of excitation in response to changes in the speed of the motor. To this end, the controller may store a lookup table that comprises different control values for different motor speeds. The control values are then used to define the phase and/or the length of excitation.

The control values stored by the lookup table may be those for a nominal motor. Moreover, the control values may be selected such that the speed of the nominal motor, when operating under a nominal load, does not exceed an upper threshold and/or drop below a lower threshold. However, for a mass-produced motor, tolerances in the motor and/or the load under which the motor operates may mean that actual speed of the motor exceeds the upper threshold and/or drops below the lower threshold.

SUMMARY OF THE INVENTION

In a first aspect, the present invention provides a method of controlling a brushless motor, the method comprising: storing a lookup table, the lookup table comprising a control value for each of a plurality of speeds; periodically obtaining a speed-adjusted control value; and exciting a phase winding of the motor, the speed-adjusted control value being used to define one of a phase and a length of excitation, wherein obtaining the speed-adjusted control value comprises: measuring a speed of the motor; increasing or decreasing a speed-adjust variable by a predetermined constant in the event that the measured speed is greater or less than a threshold; selecting a control value from the lookup table using the measured speed; and adjusting the selected control value using the speed-adjust variable to obtain the speed-adjusted control value.

The speed of the motor is therefore controlled by adjusting the control value selected from the lookup table. The speed-adjusted control value is used to define the phase or the length of excitation and therefore influences the power driven into the motor. The control value may therefore be adjusted such that the power increases should the speed of the motor drop below a lower threshold, or decreases should the speed of the motor exceed an upper threshold. Accordingly, the method may be used to ensure that the motor does not operate at speeds greater or less than a threshold for prolonged periods.

Reference to increasing or decreasing the speed-adjust variable in the event that the measured speed is greater or less than a threshold should not be understood to mean that the speed-adjust variable is increased when the measured speed is greater than the threshold and decreased when the measured speed is less than the threshold. Instead, the term should be understood to mean that the speed-adjust variable may be increased or decreased, and that this may occur in the event that the measured speed is greater than the threshold or the measured speed is less than the threshold.

The method involves periodically obtaining the speed-adjusted control value, which comprises measuring the speed of the motor and increasing or decreasing the speed-adjust variable whenever the speed is greater or less than a threshold. As a result, the method is able to control the speed of a motor for which the tolerance in the power and/or load is relatively large.

The method is relatively simple to implement computationally, and the memory requirements are relatively small. Accordingly, the method may be implemented using a relatively simple and therefore cheap controller. Additionally, the method may be implemented without adversely affecting the execution of other routines.

Adjusting the selected control value may comprise adding the speed-adjust variable to or subtracting the speed-adjust variable from the selected control value. Addition and subtraction are relatively simple operations to perform computationally. Accordingly, the method may be implemented using a relatively simple and cheap controller.

The method may comprise increasing or decreasing the speed-adjust variable by the predetermined constant in the event that the measured speed is one of greater than an upper threshold and less than a lower threshold. The speed-adjust variable is then set to zero in the event that the measured speed is the other of greater than an upper threshold and less than a lower threshold. Adjustment of the control value therefore begins when the speed either exceeds the upper threshold or drops below the lower threshold. Once initiated, adjustment of the control value continues until the speed either drops below the lower threshold or exceeds the upper threshold. The speed-adjust variable may act to decrease or increase the control period selected from the lookup table, such that less or more power is driven into the motor over each electrical half-cycle. This in turn should cause the speed of the motor or the rate of acceleration of the motor to decrease or increase. Accordingly, the method may be used to ensure that the motor does not operate at speeds greater than the upper threshold or lower than the lower threshold for prolonged periods.

It may be desirable to constrain the speed of the motor between an upper threshold and a lower threshold. Accordingly, the method may comprise increasing or decreasing the speed-adjust variable by a first predetermined constant in the event that the measured speed is greater than an upper threshold, and increasing or decreasing the speed-adjust variable by a second predetermined constant in the event that the measured speed is less than a lower threshold. Different predetermined constants may be used. Alternatively, the first and second predetermined constants may be one and the same. In this instance, the method then comprises one of increasing and decreasing the speed-adjust variable in the event that the measured speed is greater than the upper threshold and the other of increasing and decreasing the speed-adjust variable in the event that the measured speed is less than the lower threshold.

The method may comprise leaving the speed-adjust variable unchanged in the event that the measured speed is less than the upper threshold and greater than the lower threshold. Consequently, when operating under a constant load, the speed of the motor may stabilise at a value between the two thresholds.

The method may comprise rectifying an alternating voltage to provide a rectified voltage, exciting the phase winding with the rectified voltage, and obtaining the speed-adjusted control value in response to each zero-crossing of the alternating voltage. This then has the advantage that the speed-adjusted control value is updated at regular intervals without the need for a dedicated timer. Additionally, the speed-adjusted control value may be updated in synchrony with the cycle of the alternating voltage. As a result, the waveform of current drawn from the power supply providing the alternating voltage is generally more stable.

In a second aspect, the present invention provides a control system for a brushless motor, the control system performing a method according to any one of the preceding paragraphs.

In a third aspect, the present invention provides a motor assembly comprising a brushless motor and a control system according to the preceding paragraph.

BRIEF DESCRIPTION OF THE DRAWINGS

In order that the present invention may be more readily understood, embodiments of the invention will now be described, by way of example, with reference to the accompanying drawings, in which:

FIG. 3 details the allowed states of the inverter in response to control signals issued by the controller of the motor system;

FIG. 5 illustrates the behaviour of SPEED_ADJUST and T_PHASE when implementing the method of FIG. 4;

DETAILED DESCRIPTION OF THE INVENTION

Figure 1:
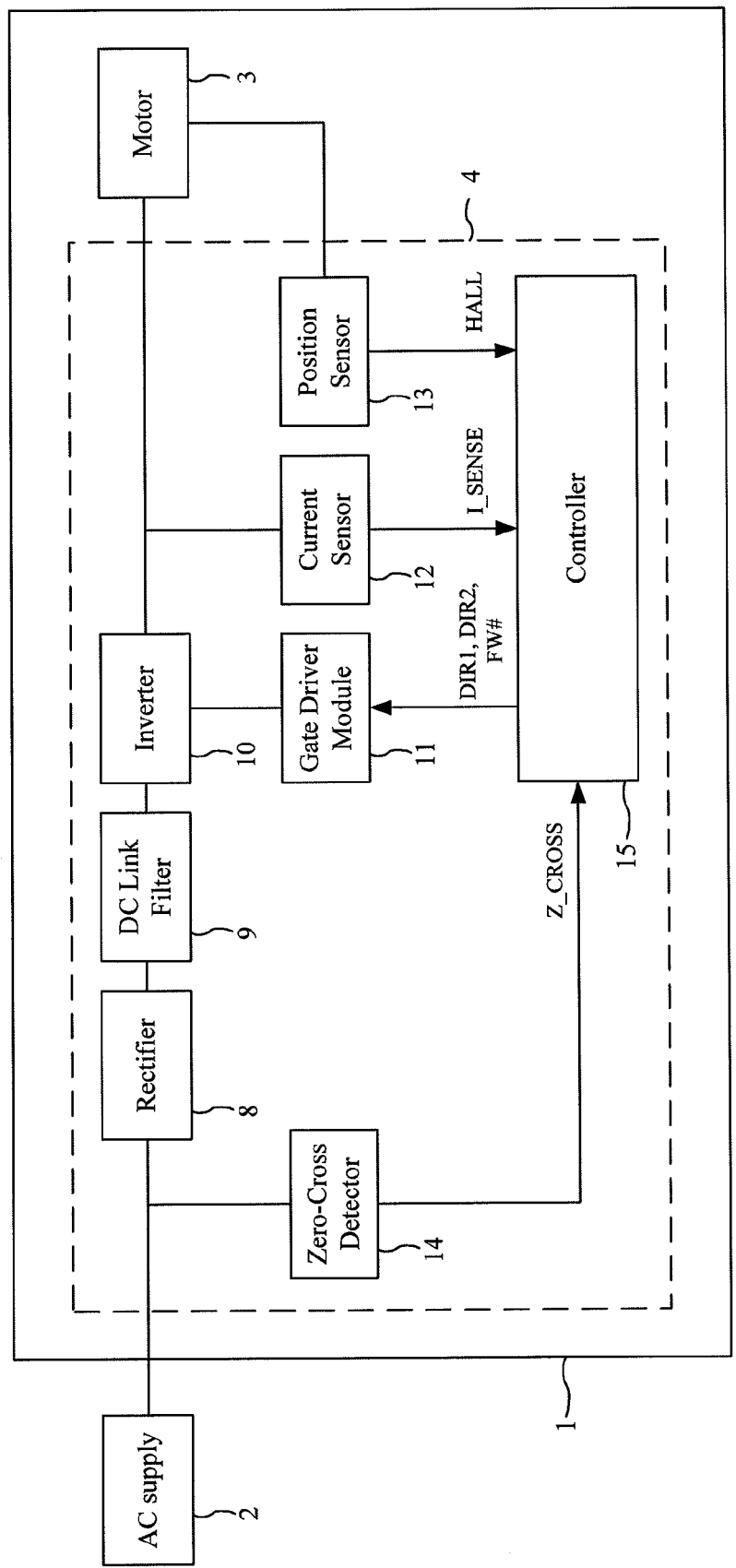
FIG. 1 is a block diagram of a motor system in accordance with the present invention.
Figure 2:
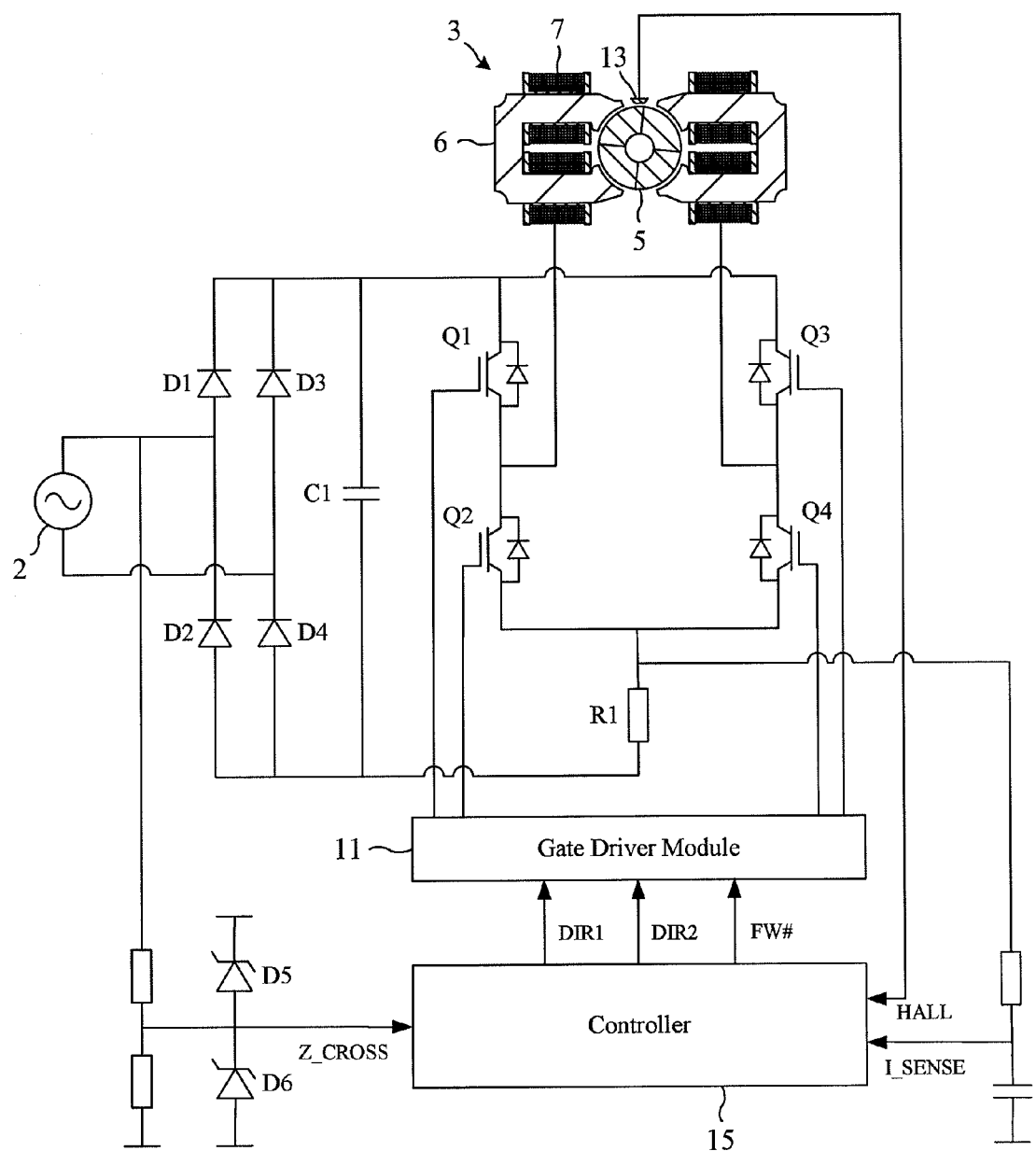
FIG. 2 is a schematic diagram of the motor system.

The motor system 1 of FIGS. 1 and 2 is powered by an AC power supply 2 and comprises a brushless motor 3 and a control system 4.

The motor 3 comprises a permanent-magnet rotor 5 that rotates relative to a stator 6 having a single phase winding 7.

The control system 4 comprises a rectifier 8, a DC link filter 9, an inverter 10, a gate driver module 11, a current sensor 12, a rotor-position sensor 13, a zero-cross detector 14, and a controller 15.

The rectifier 8 comprises a full-wave bridge of four diodes D1-D4 that rectify the output of the AC power supply 2 to provide a DC voltage.

The DC link filter 9 comprises a capacitor C1 that smoothes the relatively high-frequency ripple that arises from switching of the inverter 10. If required, the DC link filter 9 may additionally smooth the rectified DC voltage at the fundamental frequency.

The inverter 10 comprises a full bridge of four power switches Q1-Q4 that couple the DC link voltage to the phase winding 7. Each of the switches Q1-Q4 includes a freewheel diode.

The gate driver module 11 drives the opening and closing of the switches Q1-Q4 in response to control signals received from the controller 15.

The current sensor 12 comprises a sense resistor R1 located on the negative rail of the inverter 10. The voltage across the current sensor 12 therefore provides a measure of the current in the phase winding 7 when connected to the power supply 2. The voltage across the current sensor 12 is output to the controller 15 as a current sense signal, I_SENSE.

The rotor-position sensor 13 comprises a Hall-effect sensor that outputs a digital signal, HALL, that is logically high or low depending on the direction of magnetic flux through the sensor 13. By locating the sensor 13 adjacent the rotor 5, the HALL signal provides a measure of the angular position of the rotor 5. More particularly, each edge of the HALL signal indicates a change in the polarity of the rotor 5. When rotating, the permanent-magnet rotor 5 induces a back EMF in the phase winding 7. Consequently, each edge of the HALL signal additionally represents a change in the polarity of the back EMF in the phase winding 7.

The zero-cross detector 14 comprises a pair of clamping diodes D5,D6 that output a digital signal, Z_CROSS, that is logically high when the voltage of the AC supply 2 is positive and logically low when the voltage of the AC supply 2 is negative. Each edge of the Z_CROSS signal thus represents a zero-crossing in the voltage of the AC supply 2.

The controller 15 is responsible for controlling the operation of the motor system 1. In response to the input signals: HALL, I_SENSE and Z_CROSS, the controller 15 generates and outputs three control signals: DIR1, DIR2, and FW#. The control signals are output to the gate driver module 11, which in response drives the opening and closing of the switches Q1-Q4 of the inverter 10.

DIR1 and DIR2 control the direction of current through the inverter 10 and thus through the phase winding 7. When DIR1 is pulled logically high and DIR2 is pulled logically low, the gate driver module 11 closes switches Q1 and Q4, and opens switches Q2 and Q3, thus causing current to be driven through the phase winding 7 from left to right. Conversely, when DIR2 is pulled logically high and DIR1 is pulled logically low, the gate driver module 11 closes switches Q2 and Q3, and opens switches Q1 and Q4, thus causing current to be driven through the phase winding 7 from right to left. Current in the phase winding 7 is therefore commutated by reversing DIR1 and DIR2. If both DIR1 and DIR2 are pulled logically low, the gate drive module 11 opens all switches Q1-Q4.

FW# is used to disconnect the phase winding 7 from the power supply 2 and allow current in the phase winding 7 to freewheel around the low-side loop of the inverter 10. Accordingly, in response to a FW# signal that is pulled logically low, the gate driver module 11 causes both high-side switches Q1,Q3 to open. Current then freewheels around the low-side loop of the inverter 10 in a direction defined by DIR1 and DIR2.

FIG. 3 summarises the allowed states of the switches Q1-Q4 in response to the control signals of the controller 15. Hereafter, the terms 'set' and 'clear' will be used to indicate that a signal has been pulled logically high and low respectively.

The controller 15 operates in one of two modes depending on the speed of the rotor 5. At speeds below a predetermined threshold, the controller 15 operates in acceleration mode. At speeds at or above the threshold, the controller 15 operates in steady-state mode. The speed of the rotor 5 is determined from the interval, T_HALL, between two successive edges of the HALL signal. This interval will hereafter be referred to as the HALL period.

Acceleration Mode

At speeds below the speed threshold, the controller 15 commutates the phase winding 7 in synchrony with the edges of the HALL signal. Each HALL edge represents a change in the polarity of back EMF in the phase winding 7. Consequently, the controller 15 commutates the phase winding 7 in synchrony with the zero-crossings of back EMF.

Commutation involves reversing DIR1 and DIR2 (i.e. clearing DIR1 and setting DIR2, or clearing DIR2 and setting DIR1) so as to reverse the direction of current through the phase winding 7. The phase winding 7 may be freewheeling at the point of commutation. Accordingly, in addition to reversing DIR1 and DIR2, the controller 15 sets FW# so as to ensure that the inverter 10 is returned to a drive condition.

The controller 15 monitors the current sense signal, I_SENSE, and freewheels the phase winding 7 by clearing FW# whenever current in the phase winding 7 exceeds an overcurrent threshold. Freewheeling continues for a freewheel period, T_FW, during which time current in the phase winding 7 decays to a level below the overcurrent threshold. At the end of the freewheel period, the controller 15 sets FW# so as to excite the phase winding 7. Consequently, the controller 15 sequentially excites and freewheels the phase winding 7 over each electrical half-cycle.

Steady-State Mode

At speeds at or above the speed threshold, the controller 15 may advance, synchronise or retard commutation relative to each HALL edge. In order to commutate the phase winding 7 relative to a particular HALL edge, the controller 15 acts in response to the preceding HALL edge. In response to the preceding HALL edge, the controller 15 subtracts a phase period, T_PHASE, from the HALL period, T_HALL, in order to obtain a commutation period, T_COM:

$$T\_COM=T\_HALL-T\_PHASE$$

The controller 15 then commutates the phase winding 7 at a time, T_COM, after the preceding HALL edge. As a result, the controller 15 commutates the phase winding 7 relative to the subsequent HALL edge by the phase period, T_PHASE. If the phase period is positive, commutation occurs before the HALL edge (advanced commutation). If the phase period is zero, commutation occurs at the HALL edge (synchronous commutation). And if the phase period is negative, commutation occurs after the HALL edge (retarded commutation).

Advanced commutation is employed at higher rotor speeds, whilst retarded commutation is employed at lower rotor speeds. As the speed of the rotor 5 increases, the HALL period decreases and thus the time constant (L/R) associated with the phase inductance becomes increasingly important. Additionally, the back EMF induced in the phase winding 7 increases, which in turn influences the rate at which phase current rises. It therefore becomes increasingly difficult to drive current and thus power into the phase winding 7. By commutating the phase winding 7 in advance of a HALL edge, and thus in advance of a zero-crossing in back EMF, the supply voltage is boosted by the back EMF. As a result, the direction of current through the phase winding 7 is more quickly reversed. Additionally, the phase current is caused to lead the back EMF, which helps to compensate for the slower rate of current rise. Although this then generates a short period of negative torque, this is normally more than compensated by the subsequent gain in positive torque.

When operating at lower speeds, it is not necessary to advance commutation in order to drive the required current into the phase winding 7. Moreover, optimum efficiency is typically achieved by retarding commutation.

As in acceleration mode, commutation is achieved by reversing DIR1 and DIR2, and setting FW# at the end of the commutation period, T_COM. The controller 15 then monitors the current sense signal, I_SENSE, and freewheels the phase winding 7 whenever current in the phase winding 7 exceeds the overcurrent threshold. Freewheeling continues for the freewheel period, T_FW, after which the controller 15 again excites the phase winding 7. Consequently, as in acceleration mode, the controller 15 sequentially excites and freewheels the phase winding 7.

When operating in acceleration mode, the controller 15 sequentially excites and freewheels the phase winding 7 over the full length of each electrical half-cycle. In contrast, when operating in steady-state mode, the controller 15 sequentially excites and freewheels the phase winding 7 over a conduction period, T_CD, that typically spans only part of each electrical half-cycle. At the end of the conduction period, the controller 15 freewheels the winding by clearing FW#. Freewheeling then continues indefinitely until such time as the controller 15 commutates the phase winding 7. The phase period, T_PHASE, therefore defines the phase of excitation (i.e. the angle at which the phase winding 7 is excited relative to the angular position of the rotor 5) and the conduction period, T_CD, defines the length of excitation (i.e. the total angle over which the phase winding 7 is excited).

The controller 15 adjusts the phase period, T_PHASE, and the conduction period, T_CD, in response to changes in the speed of the rotor 5, as determined from the HALL period, T_HALL. To this end, the controller 15 stores a lookup table that comprises a phase period and a conduction period for each of a plurality of rotor speeds. The lookup table stores values that achieve a particular output power at each speed point.

The controller 15 updates the phase period and the conduction period in response to each edge of the Z_CROSS signal. In response to an edge of the Z_CROSS signal, the controller 15 indexes the lookup table using the HALL period, T_HALL, to select the phase period and the conduction period. Rather than updating in response to edges of the Z_CROSS signal, the controller 15 may alternatively update the phase and conduction periods at other times. For example, the controller 15 may update the phase and conduction periods in response to every nth edge of the HALL signal or after a fixed period of time has elapsed. Nevertheless, updating in response to edges of the Z_CROSS signal has the advantage that the phase and conduction periods may be updated at regular intervals without the need for a dedicated counter or timer. Additionally, the phase and conduction periods are updated in synchrony with the cycle of the alternating voltage of the power supply 2. As a result, the waveform of current drawn from the power supply 2 is generally more stable. In particular, the magnitudes of harmonics within the current waveform are generally smaller.

Speed Control

Speeds in excess of an upper threshold, SPEED_UPPER, may result in premature failure of the motor 3. The lookup table therefore stores control values that drive a nominal motor at a maximum speed of SPEED_UPPER when operating under a minimum load of LOAD_MIN. As noted above, the lookup table stores control values that achieve a particular output power at each speed point. The lookup table therefore stores control values for generating an output power that drives the minimum load, LOAD_MIN, at the maximum speed, SPEED_UPPER.

A problem arises in that tolerances in the motor system 1 influence the speed at which the motor 3 is driven. As noted above, the lookup table stores control values for generating an output power that drives a load of LOAD_MIN at a speed of SPEED_UPPER. The values stored by the lookup table, however, are those for a nominal motor. A mass-produced motor, on the other hand, will inevitably have tolerances associated with the physical properties and dimensions of the various components, e.g. tolerances in the magnetic strength of the rotor 5, the size of air gap between the rotor 5 and stator 6, etc. Consequently, when the same lookup table is used with a mass-produced motor, there is a tolerance in the output power of the motor 3 when operating at SPEED_UPPER. So, for example, the lookup table may store a phase period and a conduction period that, for the nominal motor, results in an output power of 1500 W when operating at a speed of 100 krpm. However, for a mass-produced motor, the actual output power when operating at a speed of 100 krpm may be 1500±50 W. If the motor 3 is driven at higher power, the motor 3 will accelerate to speeds in excess of SPEED_UPPER.

Equally, tolerances in the minimum load under which the motor system 1 is required to operate influence the maximum speed of the motor 3. Again, the lookup table stores control values for driving a load of LOAD_MIN at a speed of SPEED_UPPER. If the actual minimum load is less than LOAD_MIN then again the motor 3 will accelerate to speeds in excess of SPEED_UPPER.

In order to prevent the motor 3 from running at speeds in excess of SPEED_UPPER for prolonged periods, the controller 15 employs a speed-control scheme that reduces the output power of the motor 3 whenever the rotor speed exceeds SPEED_UPPER. The reduction in output power is achieved by adjusting one or both of the control values (i.e. the phase period and/or the conduction period) selected from the lookup table. For the purposes of the present description, the controller 15 will adjust the phase period only. However, the controller 15 might alternatively or additionally adjust the conduction period.

Figure 4:
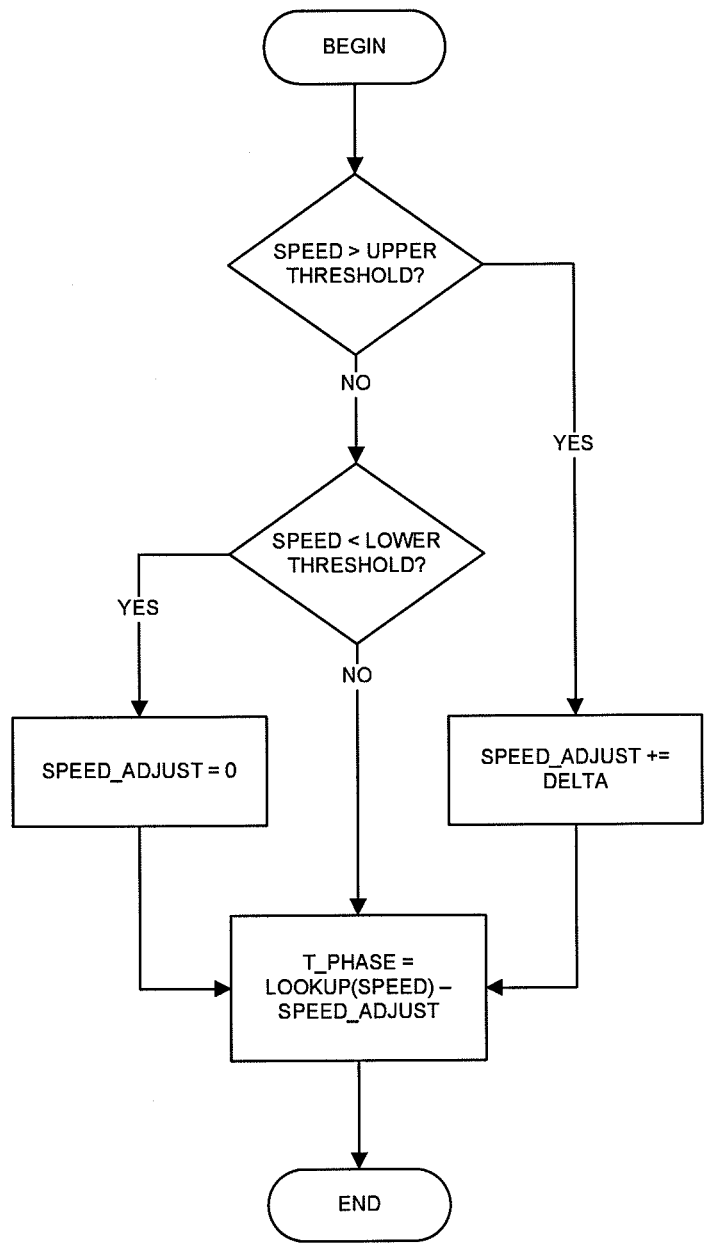
FIG. 4 is a flow diagram of a method for controlling the maximum speed of the motor.

In response to each edge of the Z_CROSS signal, the controller 15 indexes the lookup table in order to select the conduction period, T_CD. The controller 15 then executes a speed-control routine in order to obtain the phase period, T_PHASE. The speed-control routine is illustrated in FIG. 4. The controller 15 first compares the speed of the rotor 5, as defined by the HALL period, against an upper threshold, SPEED_UPPER. If the rotor speed is greater than the upper threshold, the controller 15 increases a speed-adjust variable, SPEED_ADJUST, by a predetermined constant, DELTA. Otherwise, the controller 15 compares the speed of the rotor 5 against a lower threshold, SPEED_LOWER. If the rotor speed is less than the lower threshold, the controller 15 sets the speed-adjust variable, SPEED_ADJUST, to zero. If the rotor speed is neither greater than the upper threshold nor less than the lower threshold, the controller 15 leaves the speed-adjust variable, SPEED_ADJUST, unchanged. The controller 15 then selects a phase period from the lookup table using the rotor speed, and subtracts the value of the SPEED_ADJUST variable from the selected phase period. The net result is a phase period, T_PHASE, that has been adjusted by the speed-adjust variable.

Adjustment of the phase period begins only when the rotor speed exceeds the upper threshold, SPEED_UPPER. Once initiated, adjustment of the phase period continues until the rotor speed drops below the lower threshold, SPEED_LOWER. The speed-adjust variable, SPEED_ADJUST, acts to reduce the phase period selected from the lookup table. As a result, less current and thus less power is driven into the motor 3 over each electrical half-cycle. Since less power is driven into the motor 3, the speed of the rotor 5 or the rate of acceleration of the rotor 5 decreases. The controller 15 periodically updates the phase period, e.g. in response to each edge of the Z_CROSS signal. If, during each update, the rotor speed continues to exceeds the upper threshold, the speed-adjust variable is increased. As a result, the power driven into the motor 3 is further reduced. If, on the other hand, the rotor speed is less than the upper threshold but greater than the lower threshold, the speed-adjust variable is left unchanged. As a result, the rotor 5 quickly settles at a constant speed at or just below the upper threshold. Finally, when the rotor speed drops below the lower threshold (e.g. in response to an increase in load), the phase period reverts to that selected from the lookup table, i.e. no adjustment is made to the phase period.

Operation of the speed-control scheme will now be described, by way of example, with reference to FIG. 5. In this example, the lookup table stores a phase period of 90 µs for rotor speeds greater than or equal to 94 krpm. The upper threshold, SPEED_UPPER, is 100 krpm, the lower threshold, SPEED_LOWER, is 95 krpm, and the predetermined constant, DELTA, is 0.25 µs. The initial speed of the rotor is 94 krpm. Since this is less than the lower threshold of 95 krpm, the speed-adjust variable, SPEED_ADJUST, is set to zero and thus no adjustment is made to the phase period selected from the lookup table. At t=20 ms, the rotor speed is 96 krpm, which exceeds the lower threshold of 95 krpm. Since the rotor speed is neither greater than the upper threshold of 100 krpm nor less than the lower threshold of 95 krpm, the speed-adjust variable, SPEED_ADJUST, is unchanged and therefore remains at zero. At t=140 ms, the rotor speed rises to 101 krpm, which exceeds the upper threshold of 100 krpm. The speed-adjust variable, SPEED_ADJUST, is therefore increased by 0.25 µs. Consequently, the phase period, T_PHASE, decreases to 89.75 µs. At t=160 ms, the rotor speed continues to be 101 krpm, in spite of the reduction in the phase period. Since the rotor speed continues to exceed the upper threshold of 100 krpm, the speed-adjust variable, SPEED_ADJUST, is again increased by 0.25 µs. The phase period, T_PHASE, employed by the controller is therefore 89.5 µs. At t=180 ms, the rotor speed drops to 100 krpm. Since the rotor speed is neither greater than the upper threshold of 100 krpm nor less than the lower threshold of 95 krpm, the speed-adjust variable, and thus the phase period, are unchanged. At t=300 ms, the rotor speed drops to 94 krpm. Since this is less than the lower threshold of 95 krpm, the speed-adjust variable is set to zero and thus the phase period, T_PHASE, reverts to 90 µs.

The speed-control scheme offers a computationally simple method of ensuring that the speed of the motor 3 does not exceed an upper threshold for prolonged periods. Consequently, the speed-control routine can be executed without adversely affecting the execution of other routines by the controller 15. Moreover, the memory requirements of the speed-control scheme are relatively small. In particular, four registers only are required to store SPEED_LOWER, SPEED_UPPER, DELTA and SPEED_ADJUST. By incrementally increasing the speed-adjust variable, SPEED_ADJUST, whenever the rotor speed exceeds the upper threshold, the speed-control scheme is able to limit the maximum speed of motors for which the tolerance in output power and/or minimum load is relatively large.

An alternative solution to that provided by the speed-control scheme would be to employ a lookup table that takes into account the tolerance stack. The lookup table would then store values that drive the nominal motor at reduced output power such that the speed of a motor at the tolerance limit does not exceed SPEED_UPPER. A difficulty with this solution is that most motors will then be driven at lower power and thus the full potential the motor 3 is unrealised. The speed-control scheme, on the other hand, is able to limit the maximum speed of the motor whilst simultaneously maximising the output power of the motor 3.

A further solution would be to employ a lookup table in which the control values at speeds in excess of the upper threshold, SPEED_UPPER, result in a significant drop in output power. So, for example, the lookup table may store a phase period of 90 μs for speeds below SPEED_UPPER and 80 μs for speeds above SPEED_UPPER. The difficulty with this solution is that the speed of the motor 3 would then oscillate. In particular, when the rotor speed exceeds SPEED_UPPER, the phase period would decrease from 90 μs to 80 μs. This relatively large decrease in the phase period would result in a relatively large and sudden decrease in the output power and thus the speed of the motor 3. When the speed of the motor 3 drops below SPEED_UPPER, the phase period would increase from 80 μs to 90 μs a result, the output power would increase suddenly and the motor 3 would accelerate to a speed in excess of SPEED_UPPER, at which point the phase period would again decrease to 80 μs. The speed of the motor 3 would therefore oscillate around SPEED_UPPER. In contrast, with the speed-control scheme implemented by the controller 15, the phase period is decreased by small amounts (defined by DELTA) until such time as the rotor speed drops below the upper threshold. The phase period is therefore decreased by an amount that is particular to each motor. Once the speed drops below the upper threshold, no further adjustment is made to the phase period and thus the speed of the motor 3 quickly stabilises at or just below the upper threshold. The table illustrated in FIG. 5 may imply that the speed of the motor 3 oscillates when employing the speed-control scheme. However, this particular table has been put together simply to illustrate the different situations that occur during speed control. In reality, whilst the load is constant, the speed of the motor 3 will quickly stabilise at or just below the upper threshold.

Figure 6:
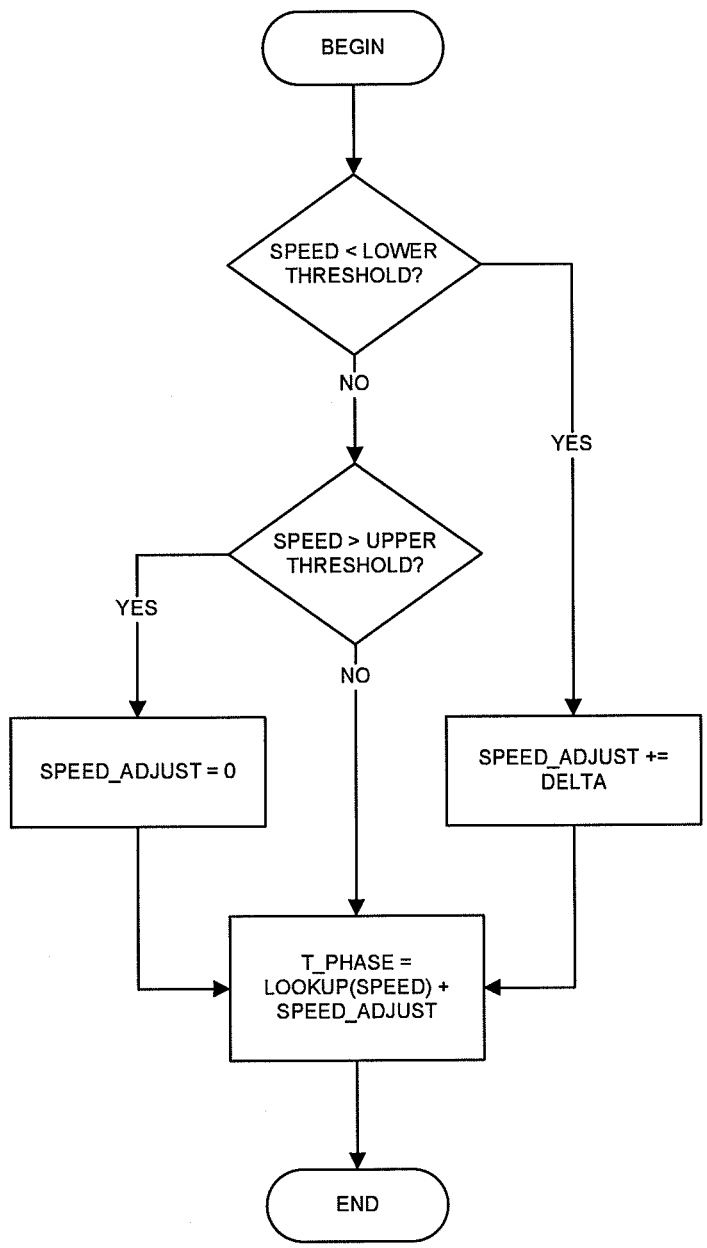
FIG. 6 is a flow diagram of a method for controlling the minimum speed of the motor.

The speed-control scheme described above is used to limit the maximum speed of the motor 3. Alternatively, the speed-control scheme may be used to limit the minimum speed of the motor 3. As illustrated in FIG. 6, the controller 15 increases the speed-adjust variable, SPEED_ADJUST, whenever the rotor speed is less than the lower threshold, SPEED_LOWER. The speed-adjust variable, SPEED_ADJUST, is then set to zero whenever the rotor speed is greater than the upper threshold, SPEED_UPPER.

If the rotor speed is neither greater than the upper threshold nor less than the lower threshold, the speed-adjust variable, SPEED_ADJUST, is unchanged. The controller 15 then indexes the lookup table using the rotor speed to select a phase period, and adds the value of the SPEED_ADJUST variable to the selected phase period. The net result is a phase period, T_PHASE, that is again adjusted by the SPEED_ADJUST variable. This time, however, the SPEED_ADJUST variable acts to increase the phase period selected from the lookup table. As a result, more current and thus more power is driven into the motor 3 and thus the speed of the rotor 5 or the rate of acceleration of the rotor 5 increases.

Figure 7:
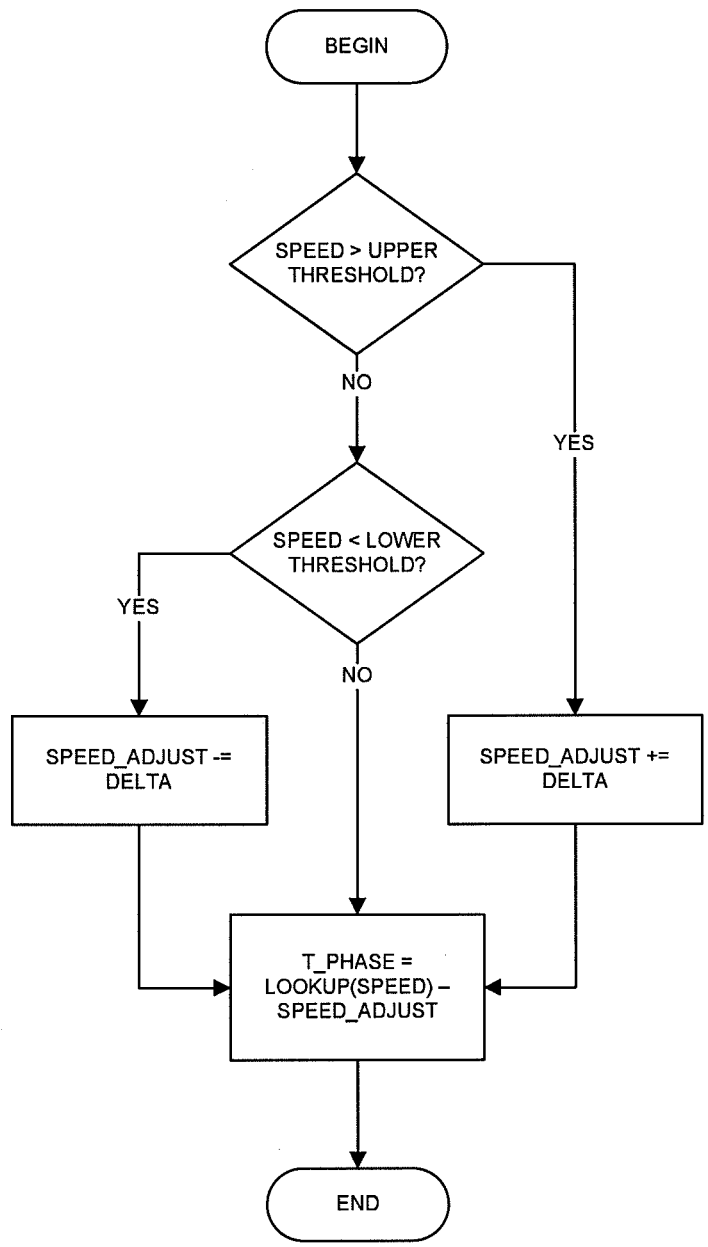
FIG. 7 is a flow diagram of a method for constraining the speed of the motor between an upper threshold and a lower threshold.

The speed-control scheme may be used to limit both the minimum speed and the maximum speed of the motor 3, as illustrated in FIG. 7. In this instance, the controller 15 increases the speed-adjust variable, SPEED_ADJUST, whenever the rotor speed is greater than the upper threshold, SPEED_UPPER, and decreases the speed-adjust variable whenever the rotor speed is less than the lower threshold, SPEED_LOWER. If the rotor speed is neither greater than the upper threshold nor less than the lower threshold, the controller 15 leaves the speed-adjust variable, SPEED_ADJUST, unchanged. The controller 15 then indexes the lookup table using the rotor speed to select a phase period, and subtracts value of the SPEED_ADJUST variable from the selected phase. The net result is that the phase period is decreased whenever the rotor speed is greater than the upper threshold and increased whenever the rotor speed is less than the lower threshold. As a result the speed of the motor 5 is constrained between the upper threshold and the lower threshold.

In the example illustrated in FIG. 7, the speed-adjust variable is increased and decreased by the same predetermined constant, DELTA. Conceivably, however, the speed-adjust variable may be increased by a first predetermined constant, DELTA_1, and decreased by a second predetermined constant, DELTA_2. This may then result in better control over the motor speed.

In the event of a fault, it may prove impossible for the controller 15 to control the speed of the motor 3. Accordingly, the controller 15 may halt excitation of the phase winding 7 in the event that the rotor speed and/or the speed-adjust variable exceeds or drops below a particular value. For example, in the table illustrated in FIG. 5, the controller 15 may halt excitation in the event that the rotor speed exceeds 104 krpm or if the speed-adjust variable exceeds 2.0 μs.

In the speed-control scheme described above, the speed-adjust variable may be increased or decreased by a predetermined constant. Moreover, the value of the speed-adjust variable may be added or subtracted from the control value selected from the lookup table. Conceivably, other mathematical operators may be employed for adjusting the control value. For example, the control value selected from the lookup table may be multiplied by the speed-adjust variable. In this instance, the default value for the speed-adjust variable would be one rather than zero. Accordingly, in a more general sense, the controller 15 may be said to adjust the selected control value using the speed-adjust variable. Although other mathematical operators may be used, addition and subtraction have the advantage of being computationally simple. As a result, a relatively simple and therefore cheap controller 15 may be used.

The invention claimed is:

1. A method of controlling a brushless motor, the method comprising:
   storing a lookup table, the lookup table comprising a control value for each of a plurality of speeds;
   periodically obtaining a speed-adjusted control value; and
   exciting a phase winding of the motor, the speed-adjusted control value being used to define one of a phase and a length of excitation,
   wherein obtaining the speed-adjusted control value comprises:

measuring a speed of the motor;

increasing or decreasing a speed-adjust variable by a predetermined constant in the event that the measured speed is greater or less than a threshold;

selecting a control value from the lookup table using the measured speed; and adjusting the selected control value using the speed-adjust variable to obtain the speed-adjusted control value.

2. A method as claimed in claim 1, wherein adjusting the selected control value comprises adding the speed-adjust variable to or subtracting the speed-adjust variable from the selected control value.

3. A method as claimed in claim 1, wherein the method comprises increasing or decreasing the speed-adjust variable by the predetermined constant in the event that the measured speed is one of greater than an upper threshold and less than a lower threshold, and setting the speed-adjust variable to zero in the event that the measured speed is the other of greater than an upper threshold and less than a lower threshold.

4. A method as claimed in claim 3, wherein the method comprises leaving the speed-adjust variable unchanged in the event that the measured speed is less than the upper threshold and greater than the lower threshold.

5. A method as claimed in claim 1, wherein the method comprises increasing or decreasing the speed-adjust variable by a first predetermined constant in the event that the measured speed is greater than an upper threshold, and increasing or decreasing the speed-adjust variable by a second predetermined constant in the event that the measured speed is less than a lower threshold.

6. A method as claimed in claim 5, wherein the first and second predetermined constants are one and the same, and the method comprises one of increasing and decreasing the speed-adjust variable in the event that the measured speed is greater than the upper threshold and the other of increasing and decreasing the speed-adjust variable in the event that the measured speed is less than the lower threshold.

7. A method as claimed in claim 1, wherein the method comprises rectifying an alternating voltage to provide a rectified voltage, exciting the phase winding with the rectified voltage, and obtaining the speed-adjusted control value in response to each zero-crossing of the alternating voltage.

8. A control system for a brushless motor, the control system performing a method comprising:

storing a lookup table, the lookup table comprising a control value for each of a plurality of speeds;

periodically obtaining a speed-adjusted control value; and exciting a phase winding of the motor, the speed-adjusted control value being used to define one of a phase and a length of excitation, wherein obtaining the speed-adjusted control value comprises:

measuring a speed of the motor;

increasing or decreasing a speed-adjust variable by a predetermined constant in the event that the measured speed is greater or less than a threshold;

selecting a control value from the lookup table using the measured speed; and adjusting the selected control value using the speed-adjust variable to obtain the speed-adjusted control value.

9. A motor assembly comprising a brushless motor and a control system as claimed in claim 8.

* * * * *